United States Patent [19]
Fukunaga

[11] 3,965,929
[45] June 29, 1976

[54] CONDUIT VALVE

[76] Inventor: Akio Fukunaga, 2055 Colby Ave., Los Angeles, Calif. 90025

[22] Filed: June 17, 1974

[21] Appl. No.: 480,000

[52] U.S. Cl. .......................... 137/503; 137/505.18; 137/599
[51] Int. Cl.² ...................................... F16K 31/12
[58] Field of Search ...................... 137/503, 505.18

[56] References Cited
UNITED STATES PATENTS

| | | |
|---|---|---|
| 942,042 | 11/1909 | Petley ..................... 137/505.18 X |
| 1,044,053 | 11/1912 | Huxford ............................. 137/503 |
| 1,050,763 | 1/1913 | Cooper ................................ 137/503 |
| 2,633,147 | 3/1953 | Badami .......................... 137/503 X |
| 2,805,680 | 9/1957 | Longbottom ............. 137/505.18 X |
| 3,374,803 | 3/1968 | Leveque ............................. 137/503 |

FOREIGN PATENTS OR APPLICATIONS

| | | |
|---|---|---|
| 603,812 | 6/1948 | United Kingdom ................. 137/503 |

*Primary Examiner*—Harold W. Weakley
*Attorney, Agent, or Firm*—Henry M. Bissell

[57] ABSTRACT

Three elongated tubular members are disposed within one another, the second member being spaced inwardly of the first member to form a fluid channel therewith and sealed and extending through a transverse wall dividing the first member into two chambers, the third member being in sliding engagement within a passageway in the second member communicating with ports through the second member on opposite sides of the transverse wall in communication with the channel. The third member is provided with a recess communicating with the ports. The first member has two open ends, the second member has an open downstream end and closed upstream end and both opposite ends of the third member are closed. Biasing means are provided in the upstream end of the second member in connection with the adjacent end of the third member to control the third member into a channel closing position when fluid back pressure builds up in the valve or drops to zero and into a fluid channel opening position when the back pressure is relieved to normal flow levels.

9 Claims, 8 Drawing Figures

CONDUIT VALVE

BACKGROUND OF THE INVENTION

1. Field of the Invention

The present invention relates to valves, particularly fluid conduit valves.

2. Description of the Prior Art

The usual types of conduit valves make no provision for responding to fluid back pressure in the conduit when the conduit is closed. Accordingly, whenever substantial fluid back pressure is present, a strain may be placed on the conduit, particularly where the conduit is of flexible resilient material, such as rubber, plastic, or cloth hosing or the like. Moreover, in situations where substantial variations in up stream fluid pressure may occur, the usual types of valves provide no adequate means for making adjustments to compensate for the same or to permit pressure balancing upstream and downstream of the valve to avoid conduit bursting.

SUMMARY OF THE INVENTION

The improved valve of the invention is substantially as set forth in the Abstract above. The improved valve is designed for in-line installation for fluid flow control and is sensitive to fluid back pressure so that when a conduit downstream thereof is closed, the valve closes. When a conduit downstream is partially open (partial back pressure) e.g. restricted by a nozzle in the open position, full fluid flow through the valve occurs. When such conduit is fully open, absence of back pressure adjusts the valve to an intermediate fluid flow rate position, fully protecting the conduit in each such circumstance. In one embodiment of the invention, means responsive to upstream (main) pressure cooperate to regulate means biasing the valve against downstream pressure so that excessive upstream (main) pressure will open it again, thus protecting the system against pressure fluctuations which would tend to rupture the main or accessory conduit system. Accordingly, the valve is simple, effective, inexpensive and adaptable to fluid conduits of all sizes, pressures and shapes, including garden hoses, gas or water mains, oil pipelines and the like.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENTS

1. First Embodiment of FIGS. 1, 2 and 3.

a. First tubular member

Figure 1:
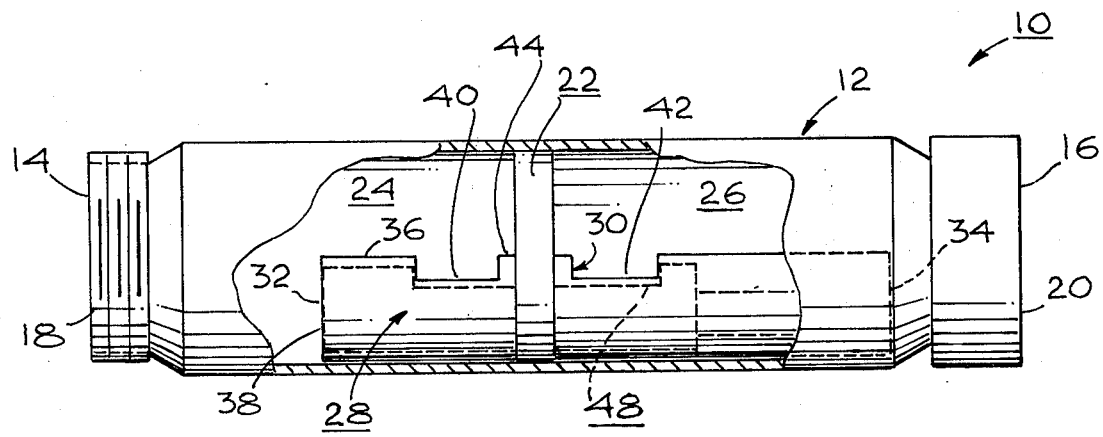
FIG. 1 is a schematic side elevation of a preferred embodiment of the fluid conduit valve of the invention, portions being broken away to illustrate certain internal features thereof.
Figure 2:
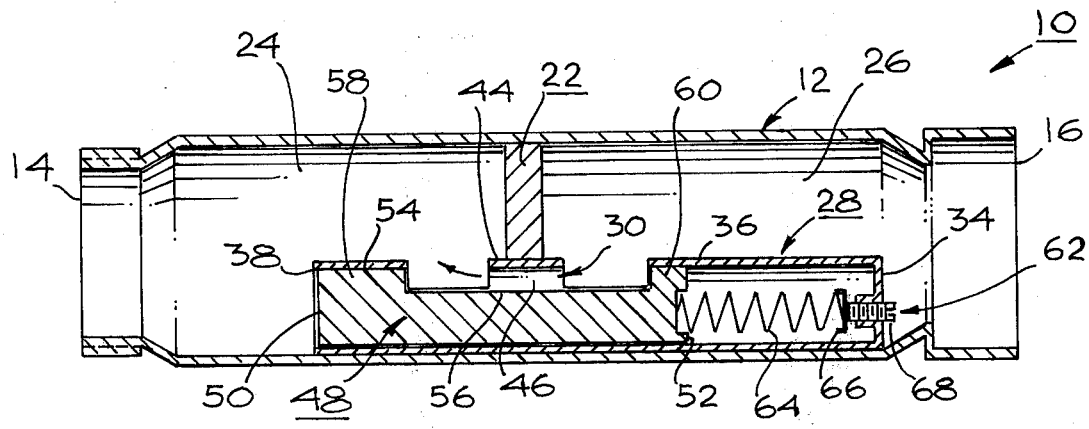
FIG. 2 is a schematic longitudinal cross-section of the embodiment of FIG. 1.

A preferred embodiment of the valve of the invention is schematically depicted in FIGS. 1, 2 and 3. Referring more particularly to those figures, a fluid conduit valve 10 of the sleeve type is shown, comprising a first hollow elongated tubular member 12, preferably cylindrical, having open opposite ends 14 and 16 fitted with conduit-connecting means 18 and 20, respectively, such as threads, etc. A transverse wall 22 completely partitions member 12 into two chambers 24 and 26.

b. Second tubular member

A second hollow tubular member 28, also preferably cylindrical, is secured within member 12 to wall 22 in fluid sealing engagement therewith and extends longitudinally into both chambers 24 and 26. Member 28 is spaced from member 12 to provide a fluid channel 30, as shown in FIGS. 1 and 2. Member 28 has an open downstream end 32 and a closed opposite upstream end 34 connected to a peripheral wall 36 enclosing longitudinal passageway 38. In wall 36 there are provided a pair of spaced ports 40 and 42, one on each side of divider wall 22 and communicating with passageway 38 and channel 30. Thus, the portion 44 of wall 36 which separates ports 40 and 42 is sealed to wall 22 and encloses a portion 46 of passageway 38 bordered by ports 40 and 42. It will be understood that members 12 and 28 can be made as a unit, i.e. integral, if desired.

c. Third tubular member

A third elongated tubular member 48, also preferably cylindrical, closed at opposite ends 50 and 52, is slidably received in fluid sealing engagement with member 28 in passageway 38. A longitudinal keyway arrangement (not shown) may be provided to prevent the member 48 from rotating during longitudinal travel within the member 28. Member 48 may be hollow or solid, preferably the latter, and the peripheral wall or exterior surface thereof 54 is configured to provide a longitudinally extending recess 56 intermediate ends 50 and 52 thereof, as shown in FIGS. 1 and 2. The end 50 presents a surface exposed to pressure in the chamber 24 for moving the member 48 in response thereto. Recess 56 is adjacent ports 40 and 42 and is of sufficient length so as to be capable of being in communication with both at the same time. However, recess 56 is short enough so that shoulders 58 and 60 are provided on each side thereof in member 48 for regulating fluid flow in channel 30.

d. Control means

Biasing Means

Control means 62 are also provided in valve 10 for regulating fluid flow through the valve. Means 62 include a biasing spring 64 disposed between the inner end of an adjustment screw 68 and the end 52 of the member 48, as shown in FIG. 2. The screw 68 extends longitudinally through end 34 so that to selectively compress spring 64 to vary the force exerted by spring 64 against member 48, biasing it in a downstream direction. Screw 68 is accessible for adjustment through end 16 of member 12.

e. Operation

Figure 3A:
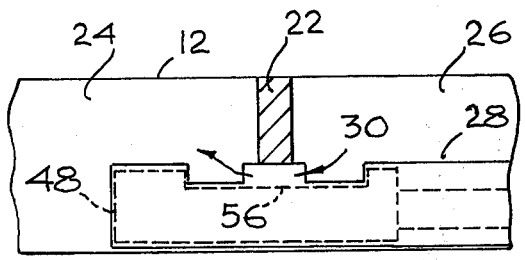
FIG. 3A, 3B and 3C are schematic representations of a portion of the valve of FIG. 1, showing it in the fully open position (A), fully closed position (B), and the partially open position (C)
Figure 3C:
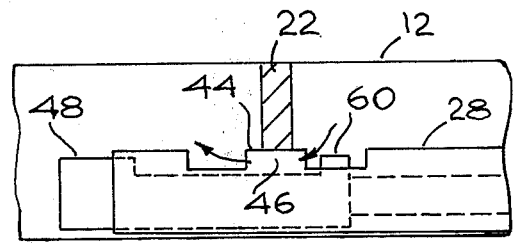
Figure 3B:
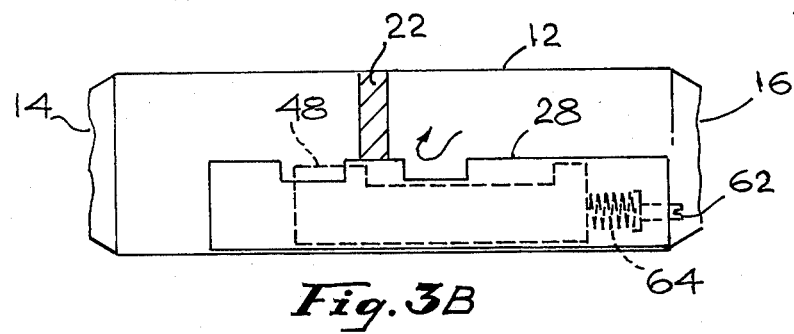

The described biasing force is adjusted via spring 64 and position of screw 68 in relation to upstream and downstream fluid pressure so that valve 10 functions as shown schematically in FIGS. 3A, 3B and 3C. Referring now to FIGS. 1 and 3, it will be seen that member 48 can be adjusted by means 62 such that, when it is connected to upstream and downstream conduits, as for example, connected into a garden hose line containing a nozzle, flow of water through the valve can be maximized (considering the line back pressure exerted by the nozzle) when the nozzle is fully open (FIG. 3A). In such event, the back pressure and spring biasing force balance out to position recess 56 into full communication with both ports 40 and 42 (FIG. 3A). Water flows into end 16, and along fluid channel 30 from chamber 26 through port 42, portion 46 and adjacent parts of passageway 38, out port 40, through the chamber 24 and out the end 14. Flow of water through valve 10 will be cut off when the downstream hose nozzle is closed (FIG. 3B). In such an event, the fluid back pressure increases and counters the spring biasing force sufficiently to shift member 48 upstream, so that shoulder 58 is disposed within portion 44 of wall 36, blocking portion 46 and thereby sealing off chamber 24 from chamber 26. This has the effect of preventing the full main pressure from acting on portions of the hose downstream of the valve. Accordingly, a positive action responsive to water or other fluid back pressure is provided. Reopening of the hose nozzle downstream will automatically open valve 10, since the water back pressure will drop, allowing spring 64 to bias member 48 to the open position. It will be noted that the described fully open and closed positions for valve 10 are automatically obtained by operation of the nozzle or other outlet mechanism and automatically provide the described compensating actions in valve 10. An intermediate valve position is schematically illustrated in FIG. 3 (C), such as occurs when the water back pressure drops to zero or approaches a very low value because the downstream conduit opening is unrestricted by a nozzle or the like. In such event, spring 64 biases member 48 downstream from the position shown in FIG. 3A so that shoulder 60 approaches portion 44 but does not totally seal off portion 46. Thus only limited flow is permitted when there is no downstream restriction, as when the garden hose nozzle is removed or, in the case of utilization of the value in a water main or gas main conduit, when there is a significant rupture of the downstream conduit. Accordingly, the valve 10 provides control of fluid flow in accordance with downstream conduit pressure conditions as may be established by a downstream fluid control device. It will be understood that spring 64 can be adjusted so as to otherwise regulate fluid flow through valve 10, depending on the particular desires and needs. If back pressure should vary, adjustments in compression of spring 64 can be easily made via screw 68 to compensate therefor. Valve 10 is particularly simple, effective, inexpensive and automatic. It is useful in fluid conduits of all sizes, including garden and large hoses such as fire hoses, etc., as well as in water mains to protect against loss of pressure due to sudden breakages and large leaks. It can be fabricated from any suitable material, such as metal (preferably corrosion resistant), plastic, hard rubber, etc.

2. Second Embodiment of FIGS. 4 and 5.

Figure 4:
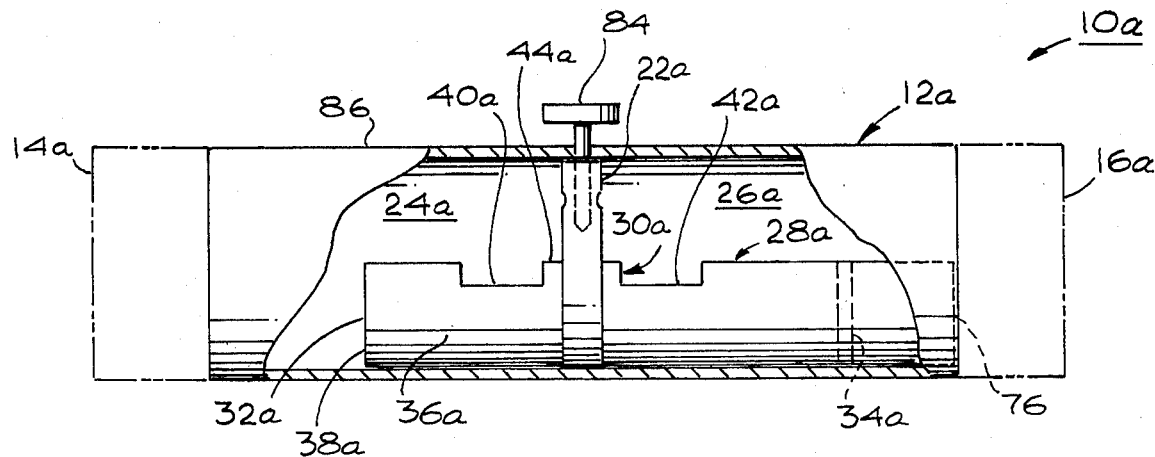
FIG. 4 is a schematic side elevation of a second embodiment of the valve of the invention, portions being broken away to illustrate the internal construction thereof.
Figure 5:
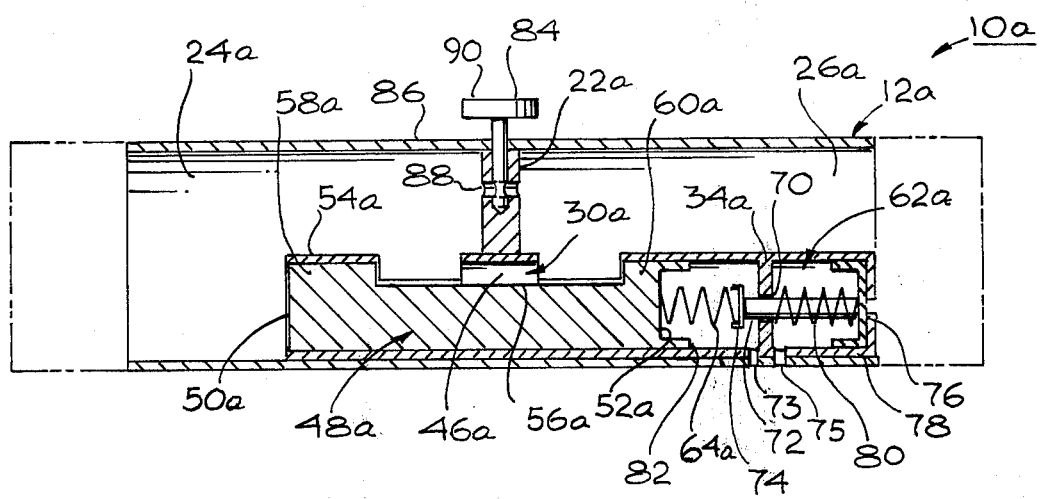
FIG. 5 is a schematic longitudinal cross-section of the embodiment of FIG. 4.

A second embodiment of the present valve is schematically illustrated in FIGS. 4 and 5. Components thereof which are similar to those of FIGS. 1, 2 and 3 in function and general construction bear the same numerals succeeded by the letter $a$. Now referring specifically to FIGS. 4 and 5, a valve 10a is shown comprising, in combination a first hollow enlongated tubular member 12a, having opposite open ends 14a and 16a and a transverse wall 22a dividing member 12a into chambers 24a and 26a, a second hollow tubular member 28a secured longitudinally through wall 22a to provide a fluid channel 30a and a third elongated tubular member 48a. Member 28a has an open downstream end 32a and a closed upstream end 34a (as more fully described below), a peripheral wall 36a enclosing a passageway 38a, defining ports 42a and 40a on opposite sides of wall 22a and communicating respectively with channel 30a and passageway 38a. Portion 44a encloses portion 46a of passageway 38a adjacent wall 22a. Tubular member 48a is slidably received in passageway 38a and has opposite closed ends 50a and 52a. Peripheral wall or surface 54a thereof defines a recess 56a adjacent ports 40a and 42a and bounded by shoulders 58a and 60a.

Control means 62a forms part of valve 10a and includes a biasing means in the form of a spring 64a seated between end 52a and an adjustable member movable longitudinally. The wall 34a is provided with an aperture 70 through which piston means comprising a piston rod 72 is disposed as shown in FIG. 5. Rod 72 is provided at its downstream end with a broad pusher surface 74 bearing against spring 64a and is secured at its upstream end to a piston 76 dimensioned to slide within a hollow tubular extension 78 open at its upstream end. A second biasing spring 80 is provided around rod 72 between wall 34a and piston 76. End 52a may also be provided with a hollow tubular extension 82 within which the downstream end of spring 64a is received. The piston 76 is responsive to upstream (main) fluid pressure and, depending on the pressure, urges rod 72 more or less firmly against spring 64a, which in turn biases member 48a in a downstream direction. When the back pressure exceeds the upstream (main) pressure, member 48a slides upstream, closing channel 30a and the flow of fluid through valve 10a, in a manner such as previously described with respect to FIG. 3B. As the back pressure urges member 48a upstream, the biasing means including spring 64a and the piston means, including spring 80, are also borne upstream. The spring 80 and associated piston 76 insure that the valve 10a is activated only in response to sudden pressure changes. Gradual changes (within limits) do not close the valve 10a. Also the spring 80 serves to prevent closure of the valve 10a from drops in main pressure upstream, as for example in the case of a momentary drop in pumping station (source) pressure. Apertures 73 and 75 serve to maintain the interior of the control means 62a at ambient level without pressure buildup.

Back pressure on the system may be relieved through valve means comprising a gate valve 84 disposed through the peripheral wall 86 of member 12a into wall 22a in communication with an aperture 88 extending longitudinally through wall 22a between chambers 24a and 26a. Gate valve 84 is provided with a handle 90 extending outwardly from wall 86 for opening and closing the same. Upstream pressure which exceeds the relieved back pressure will move member 48a downstream to the fully open position, generally as described in connection with FIG. 3A of the first embodiment. Obviously, springs 64a and 80 can be selected for maximum effectiveness. In this embodiment, valve 10a is responsive both to fluid back pressure and to fluid upstream (main) pressure, automatically adjusting to the same. An effective increase in back pressure, as when the outlet of a downstream conduit closes, closes valve 10a. Similarly, when a disorder exists in the system as when there is a sudden drop in downstream main or line pressure valve 10a automatically seals off the system. An increase in line pressure to the normal automatically adjusts valve 10a to the open position. Back pressure in excess of a normal level closes valve 10a (as for FIG. 3B), thus averting undue strain on the downstream system from maintenance of such overpressure.

Figure 6:
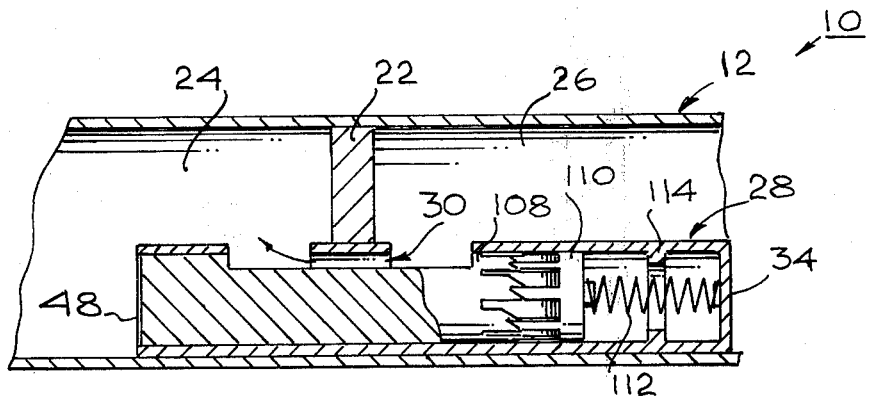
FIG. 6 is a side sectional view of a portion of the devices of FIGS. 1–5 showing an alternative valve control mechanism.

FIG. 6 shows the details of a rotary step-advance mechanism which may be employed in the embodiments of FIGS. 1–5 to provide a more graduated control of valves in accordance with the present invention. In FIG. 6, which is a partially broken-away view, the slide or third tubular member 48 is shown with the right-hand end 108 having a series of stepped portions alternately shallow and deep, with spiral convolutions interconnecting between them. A mating segment 110 is positioned between the right-hand end 108 and the spiral spring 112. Within the enclosed chamber of the second tubular member 28 is an inwardly extending ring represented in section as the projections 114. These act with the element 110 and the stepped configuration of the right-hand end 108 to cause successive rotary advances of the third tubular member 48 as the entire innerassembly is forced against the spiral spring 112 and up against the ring 114. Each time the assembly reaches the stop ring 114, the member 48 is rotated by a given angle so that for successive closures of a nozzle on the downstream side of the valve 10 the passage which is available for full flow through the opening provided by the second and third tubular members 28, 48 is gradually restricted by steps. Thus in gradual fashion the amount of the flow when in the full flow position can be controlled between a limited amount and the full flow capacity represented by the opening available in the position shown in FIG. 6. Added flexibility and extent of control of the valve 10 by means of manipulation of the pressure condition on the downstream side is therefore provided by the use of such an arrangement in valves of the type described hereinabove.

Accordingly an improved automatic conduit valve of simplified construction, which is durable and inexpensive, and is suitable for use with all manners of fluids, both gases and liquids, in conduits both large and small, is provided. It can be constructed of any suitable material such as metal, plastic, etc. Other advantages of the invention are as set forth in the foregoing.

Although such specific arrangements of an improved conduit valve in accordance with the invention have been described for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An in-line fluid flow control valve comprising a partitioned housing upstream and downstream chambers and coupling means for coupling said chambers respectively to upstream and downstream conduits:

fluid passage defining means including first and second ports communicating respectively with said chambers and a slidable member having a recessed portion for permitting a flow between said ports and having opposite end portions for blocking flow between said ports, the slidable member having at least one downstream surface responsive to pressure in said downstream chamber for moving said member toward the upstream conduit coupling means; and biasing spring means coupled to bias said slidable member toward the downstream conduit coupling means, the biasing spring being operative to drive the slidable member in a downstream direction to a first position permitting a first minimum flow in the absence of a predetermined downstream pressure range, to balance the slidable member in an intermediate position aligning the recessed portion with said ports for maximum fluid flow for downstream pressures within said predetermined range, and to permit the slidable member to be driven upstream by further increase in downstream pressure to a second position cutting off flow for downstream pressure in excess of said predetermined range; said biasing spring means including means responsive to upstream pressure for increasing the biasing spring force as upstream pressure increases.

2. The valve according to claim 1, wherein said biasing spring means includes a compression spring and said responsive means includes a piston having a downstream portion coupled to the upstream end of said spring and having an upstream portion exposed to upstream pressure, an increase in upstream pressure causing the piston to be moved in a downstream direction to thereby compress the spring.

3. The valve according to claim 1, including back pressure relief means for relieving pressure from said downstream chamber into said upstream chamber.

4. The valve according to claim 3, wherein said back pressure relief means includes a manual valve controlling an opening communicating between the upstream and downstream chambers, portions of said manual valve, for operation thereof, projecting outwardly from said housing.

5. The valve according to claim 1, wherein said housing comprises a first elongate tubular member having ends adapted for connecting into a fluid line and having disposed therewithin an apertured transverse wall for partitioning said housing into said upstream and downstream chambers, wherein said coupling means includes a second elongate tubular member disposed within the first tubular member and in sealing relationship through said aperture in the transverse wall, said first and second ports being formed in side walls of the second tubular member respectively to upstream and downstream sides of the transverse wall, wherein said slidable member is disposed in said second tubular member and wherein said biasing means is disposed within upstream portions of the second tubular member.

6. An in-line fluid flow control valve, which comprises:
- a first tubular member having opposite ends adapted for connecting in series with a fluid conduit;
- a transverse wall disposed in sealing relationship across said first member, said wall having formed therethrough a fluid flow aperture;
- a second tubular member disposed in fluid sealing relationship through said fluid flow aperture of said transverse wall, the longitudinal axes of said first and second members being parallel, a first port being formed in a side wall of the second member adjacent to the upstream side of the transverse wall and a second port being formed in a sidewall of the second member adjacent to the downstream side of said transverse wall;
- a piston slidably mounted in fluid sealing relationship in said second member, a portion of the piston intermediate first and second end portions thereof being recessed to enable fluid flow between the upstream and downstream sides of the transverse wall through said first port, through portions of said second member, through said recessed portion of the piston and through said second port, the piston being slidable in a first upstream direction to a first fluid flow cutoff position, wherein said first end portion is between the first and second ports, and being slidable in a second downstream direction to a second fluid flow position wherein said second end portion is within the first port;
- means responsive to downstream pressure above a predetermined first pressure level to effect movement of the piston in said first direction toward said first flow cutoff position, whereby flow cutoff is provided; and
- means for biasing the piston in said second direction toward said second flow position to effect minimal flow in the absence of downstream pressure below a predetermined second pressure level, said biasing means including a compression spring disposed upstream of the second end of the piston and in contact therewith, said spring being disposed within upstream portions of said second member, an upstream end of the spring being connected to a second piston slidably disposed within portions of said second tubular member, movement of the second piston being responsive to upstream fluid pressure, an upstream end of the second member having an opening through which the second piston is exposed to upstream pressure.

7. The control valve according to claim 6, wherein said means adapted for causing movement of the piston towards said first fluid flow cutoff position includes an opening in the downstream end of the second member, whereby downstream pressure may act directly upon the first end portion of the piston.

8. The control valve as claimed in claim 6 further including a second spring positioned to bias said second piston towards an upstream position.

9. The control valve as claimed in claim 6 further including means defining a second fluid flow path through the transverse wall and means for controlling the flow in said second path, whereby pressure may be manually relieved from one side to the other of said transverse wall.

* * * * *